(12) United States Patent
Wieringa

(10) Patent No.: US 6,865,841 B2
(45) Date of Patent: Mar. 15, 2005

(54) FISHING ROD AND REEL CONTAINER

(75) Inventor: Jeffrey L. Wieringa, San Marcos, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/304,158

(22) Filed: Nov. 26, 2002

(65) Prior Publication Data

US 2004/0098900 A1 May 27, 2004

(51) Int. Cl.$^7$ .............................................. A01K 97/08
(52) U.S. Cl. ...................... 43/26; 206/315.11; 224/922
(58) Field of Search ...................... 43/26; 206/315.11; 224/922

(56) References Cited

U.S. PATENT DOCUMENTS

| | | | | |
|---|---|---|---|---|
| 827,736 A | * | 8/1906 | Lamphier | 43/26 |
| 1,903,798 A | * | 4/1933 | Turner | 43/26 |

(List continued on next page.)

FOREIGN PATENT DOCUMENTS

| | | | | |
|---|---|---|---|---|
| CA | 459902 B1 | * | 9/1949 | 43/26 |
| DE | 19632667 B1 | * | 3/1997 | |
| DE | 19536393 B1 | * | 4/1997 | |
| FR | 1419803 B1 | * | 10/1965 | 43/26 |
| GB | 2224916 B1 | * | 5/1990 | |
| GB | 2342851 B1 | * | 4/2000 | |
| JP | 7-257565 B1 | * | 10/1995 | |
| JP | 11-75654 B1 | * | 3/1999 | |
| JP | 11-239438 B1 | * | 9/1999 | |
| JP | 2000-236792 B1 | * | 9/2000 | |
| JP | 2001-17051 B1 | * | 1/2001 | |
| JP | 2001-204340 B1 | * | 7/2001 | |
| JP | 2001-245570 B1 | * | 9/2001 | |
| JP | 2002-17224 B1 | * | 1/2002 | |
| JP | 2002-209492 B1 | * | 7/2002 | |
| JP | 2002-315490 B1 | * | 10/2002 | |
| JP | 2003-180218 B1 | * | 7/2003 | |
| JP | 2003-204747 B1 | * | 7/2003 | |

*Primary Examiner*—Darren W. Ark
(74) *Attorney, Agent, or Firm*—William J. Huebsch

(57) ABSTRACT

A protective container for a fishing rod with a reel mounted on a handle portion of the rod. The container includes a rigid elongate tube having an inner surface defining a cavity adapted to receive the fishing rod; and a flexible housing attached to the tube adjacent one end that is adapted to enclose the reel and the handle portion of the rod on which the reel is mounted. That housing includes opposite wall portions having side wall parts each adapted to lie along and across a different side of the reel and handle portion of the rod, which wall portions include peripheral parts extending toward each other from the peripheries of the side wall parts that can be releasably attached together so that opposed inner surfaces of the wall portions define a cavity that can receive the reel and the handle portion of the rod on which it is mounted. The wall portions can be separated to allow the rod and reel to be placed in or removed from the container. The wall portions of the housing include layers of fabric defining their inner and outer surfaces, and layers of thermo formed foam between and bonded to those layers of fabric that provide stiff, shape retaining, flexible, side wall portions shaped and adapted to protect the reel. The side wall portions can have through vent openings that allow evaporation of moisture from the rod and reel when the container is closed.

20 Claims, 4 Drawing Sheets

U.S. PATENT DOCUMENTS

| | | | | |
|---|---|---|---|---|
| 2,149,087 A | * | 2/1939 | Fisher | 43/26 |
| 2,473,977 A | * | 6/1949 | Tutton | 206/315.11 |
| 2,591,674 A | * | 4/1952 | Chalker | 43/26 |
| 2,595,230 A | * | 5/1952 | Daviau | 43/26 |
| 2,640,622 A | * | 6/1953 | Sabatino | 43/26 |
| 2,650,449 A | * | 9/1953 | Suring | 43/26 |
| 2,723,482 A | * | 11/1955 | Marten | 43/26 |
| 2,749,645 A | * | 6/1956 | McKern | 43/26 |
| 2,902,790 A | * | 9/1959 | Harvey | 43/26 |
| 2,913,030 A | * | 11/1959 | Fisher | 206/315.11 |
| 3,033,259 A | * | 5/1962 | Landis, Sr. | 206/315.11 |
| 3,131,503 A | * | 5/1964 | Gottula | 43/26 |
| 3,349,512 A | * | 10/1967 | Walker | 43/26 |
| 3,624,948 A | * | 12/1971 | De Baker, Sr. | 43/26 |
| 3,641,697 A | * | 2/1972 | Heidtman et al. | 43/26 |
| 3,662,933 A | * | 5/1972 | Michal | 43/26 |
| 3,674,190 A | * | 7/1972 | Wright | 43/26 |
| 3,811,216 A | * | 5/1974 | Sauey et al. | 43/26 |
| 4,171,588 A | * | 10/1979 | Hoffman et al. | 43/26 |
| 4,306,601 A | * | 12/1981 | Wallis et al. | 43/26 |
| 4,546,877 A | * | 10/1985 | Evans | 206/315.11 |
| 4,643,302 A | * | 2/1987 | Baumgardner | 206/315.11 |
| 4,967,504 A | * | 11/1990 | Craft | 43/26 |
| 5,005,743 A | * | 4/1991 | Ramsay | 224/922 |
| 5,046,279 A | * | 9/1991 | Smith et al. | 43/26 |
| 5,277,306 A | * | 1/1994 | Sargent | 43/26 |
| 5,319,874 A | * | 6/1994 | Vance | 43/26 |
| 5,341,590 A | * | 8/1994 | Hepworth et al. | 43/26 |
| 5,425,194 A | * | 6/1995 | Miller | 43/26 |
| 5,488,799 A | * | 2/1996 | Hauschild | 43/26 |
| 5,547,079 A | * | 8/1996 | Pino | 206/315.11 |
| 5,619,819 A | * | 4/1997 | Hauschild | 43/26 |
| 5,960,950 A | * | 10/1999 | Meeker et al. | 206/315.11 |
| 6,085,695 A | * | 7/2000 | Miller et al. | 43/26 |
| 6,343,728 B1 | * | 2/2002 | Carbone | 43/26 |
| 6,408,564 B1 | * | 6/2002 | Murphy | 43/26 |
| 6,450,333 B1 | * | 9/2002 | McClenahan et al. | 206/315.11 |
| 6,722,496 B2 | * | 4/2004 | Gantert | 206/315.11 |
| 2004/0045212 A1 | * | 3/2004 | Henault et al. | 43/26 |

* cited by examiner

FISHING ROD AND REEL CONTAINER

FIELD OF THE INVENTION

The present invention relates to protective containers for fishing rods with reels mounted on handle portions of the rods, and in one aspect to such containers for fly rods having the reels mounted on ends of the handle portions of the rods.

BACKGROUND OF THE INVENTION

Effective protection for fishing rods and reels is desirable because the rods and reels can be expensive (e.g., better fly rods can cost in excess of $800.00), and transporting uncased rods and reels between home and a fishing location can too often result in bringing them into contact with structures (e.g., closing car doors or other items being conveyed) in a manner that can break or mar the rods and/or reels.

Thus, the art is replete with structures for protective containers for fishing rods with reels mounted on handle portions of the rods, including such containers for fly rods having the reels mounted on ends of handle portions of the rods. U.S. Pat. Nos. 6,408,564; 6,343,728; 5,619,819; 5,341,590; 5,319,874; 5,046,279; 4,967,504; and 4,171,588 provide illustrative examples.

For several years a protective container for a fly rod with a reel mounted on an end of a handle portion of the rod has been commercially available from 3M Company, St. Paul, Minn., under the trade designation "DB DUN by Scientific Anglers". That protective container includes a rigid elongate tube having an inner surface defining a cavity adapted to receive a fishing rod; and a flexible housing attached to the tube adjacent one end that is adapted to enclose the reel and the end part of a handle portion of the rod on which the reel is mounted. That housing includes opposite wall portions having side wall parts each adapted to lie along and across a different side of the reel and handle portion of the rod, and peripheral parts extending toward each other from peripheries of the side wall parts so that opposed inner surfaces of the wall portions define a cavity that can receive the reel and the handle portion of the rod on which it is mounted. The housing includes a zipper for releasably attaching together distal edges of the peripheral parts so that with the zipper open the wall portions can be separated to allow the rod and reel to be placed in or removed from the housing, and when closed the zipper retains the wall portions in their protective positions around the reel and handle portion. The wall portions in that protective housing are formed from inner and outer layers of heavy woven nylon fabric sewn together around layers of foam padding. While the protection provided by that protective container for a fly rod with a reel mounted on it is quite good, efforts are ongoing to provide them with even better protection.

DISCLOSURE OF THE INVENTION

The present invention provides a protective container for a fishing rod and a reel mounted on a handle portion of the rod, which protective container not only provides excellent protection against rough handling for the rod and reel, but also facilitates evaporation of moisture from the rod and reel (i.e., particularly moisture in the line on the reel) that, if not allowed to evaporate, could, over time, result in deterioration due to corrosion, mildew, or the like.

According to the present invention there is provided a protective container for a fishing rod with a reel mounted on a handle portion of the rod that, like the protective container described above, includes a rigid elongate tube having an inner surface defining a cavity adapted to receive a fishing rod; and a flexible housing attached to the tube adjacent one end that is adapted to enclose the reel and part of the handle portion of the rod on which the reel is mounted. That housing includes opposite wall portions having side wall parts each adapted to lie along and across a different side of the reel and handle portion of the rod, and peripheral parts extending toward each other from the peripheries of the side wall parts so that opposed inner surfaces of the wall portions define a cavity that can receive the reel and the handle portion of the rod on which it is mounted. The flexible housing includes means (e.g., a zipper) for releasably attaching together distal edges of the peripheral parts so that, with the zipper open, the wall portions can be separated to allow the rod and reel to be placed in or removed from the container, and when closed the zipper retains the wall portions in their protective positions around the reel and handle portion.

Unlike the protective container described above, however, the wall portions in the protective container according to the present invention include layers of fabric defining inner and outer surfaces of the wall portions, and a layer of thermally formed foam (e.g., a polyethylene or polyurethane closed cell foam) between and bonded to those layers of fabric. Those layers of thermo formed foam are continuous through the junctures between the side wall parts and the peripheral parts of the wall portions and are sufficiently thick to provide stiff, flexible wall portions shaped and adapted to protect the reel, which wall portions retain their shapes to help provide a visually attractive container.

The layers of thermally formed foam in the wall portions should have thicknesses in the range of about 0.12 to 0.5 inch (0.3 to 1.27 cm) and more preferably in the range of about 0.19 to 0.25 inch (0.48 to 0.64 cm) thick. The thickness of the layers of foam can be different along different parts of the wall portions. The layers of foam in the wall portions should be thermally formed to have a density in the range of about 4 to 10 pounds per cubic inch (0.12 to 0.3 kilograms per cubic centimeter), and preferably to have a density in the range of about 6 to 8 pounds per cubic inch (0.18 to 0.24 kilograms per cubic centimeter). Densities at the lower ends of those ranges provide good protection for rods and reels in the housing while having good flexibility to facilitate separating and manipulating the wall portions when the rod and reel is inserted into or removed from the container; whereas densities at the upper ends of those ranges provide even better protection than those at the lower ends, but make the wall portions more stiff so that it is not as easy to separate and manipulate the wall portions of the housing.

Also, optionally, the wall portions have through vent openings that facilitate changing of the air within the container when it is closed to facilitate evaporation of moisture from the rod and reel (i.e., particularly moisture in the line on the reel) and thereby restrict deterioration of the rod, reel or line on the reel due to corrosion, mildew, or the like. Those through vent openings should have a total area of at least 0.5 square inch (3.2 square centimeters) in each wall portion, with vent openings in each wall portion of at least 0.75 square inch (4.8 square centimeters) being preferred, and vent openings in each wall portion of at least 1 square inch (6.5 square centimeters) being more preferred.

The vent openings can be through the side wall parts of the wall portions and the container can further include a layer of reticulated foam along the inner surface of each of the side wall parts that facilitate passage of air and moisture from the reel and rod to and through the vent openings. Also, the container can include a layer of decorative material adhered along the outer surface of each of the side wall portions that can bear indicia (e.g., a trade name for the container or its manufacturer's name and/or trademarks, or the like), the through vent openings can extend through the layers of decorative material, and the container can further include layers of screen material between the outer surface and the layers of decorative material that extend across the vent openings.

BRIEF DESCRIPTION OF DRAWING

The present invention will be further described with reference to the accompanying drawing wherein like reference numerals refer to like parts in the several views, and wherein:

FIG. 2a is an enlarged fragment of the sectional view of FIG. 2 taken where indicated by the dotted circle;

FIG. 2b is an enlarged fragment of the sectional view of FIG. 2 taken where indicated by the dotted circle;

DETAILED DESCRIPTION OF THE INVENTION

Figure 1:
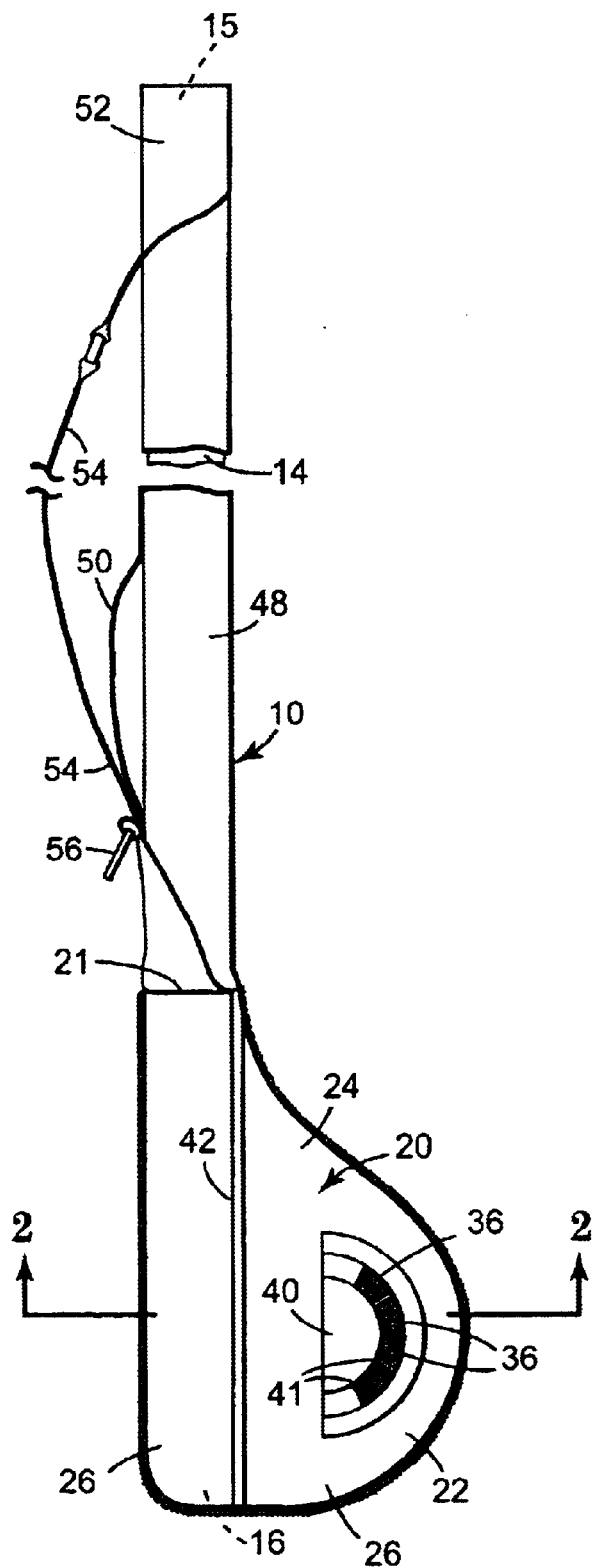
FIG. 1 is a side view of a first embodiment of a protective container according to the present invention for a fishing rod and a reel mounted on a handle portion of the rod, in which view a housing included in the container is closed.

Referring now to FIGS. 1 through 4 of the drawing there is illustrated a first embodiment of a protective container 10 according to the present invention for a fishing or fly rod and a reel mounted on a handle portion of the rod.

The container 10 comprises a rigid elongate tube 14 (e.g., of metal or polymeric material) having first and second ends 15 and 16, an axis between its ends 15 and 16, and an inner surface defining a cavity 18 adapted to receive the fishing rod. A flexible housing 20 is attached to and around the tube adjacent its second end 16 at an area of attachment 21, which housing 20 is adapted to enclose the reel and the handle portion of the rod on which the reel is mounted. That housing 20 comprises opposite wall portions 22 including side wall parts 24 each having a periphery and being adapted to lie along and across a different side of the reel and handle portion of the rod, and peripheral parts 26. The peripheral parts 26 of the wall portions 22 extend toward each other from the peripheries of the side wall parts 24 and have distal edges 28 adapted to be positioned closely adjacent each other. The opposite wall portions 22 have opposed inner surfaces 27 shaped to define (with the distal edges 28 closely adjacent each other) a cavity between the opposite wall portions 22 that can receive the reel and the handle portion of the rod on which the reel is mounted. Means in the form of a heavy duty zipper 30 are provided for releasably attaching together the distal edges 28 of the peripheral parts 26 (alternatively that means could include snaps, latches, hook and loop fasteners, magnets, or other suitable releasable attachment means). When that zipper 30 is open, the opposite wall portions 22 can be spread apart or separated by bending them adjacent where they are attached around the tube 14 to allow the rod and reel to be placed in or removed from the container 10. When closed the zipper 30 retains the wall portions 22 in their protective positions around the reel and handle portion.

Figure 2:
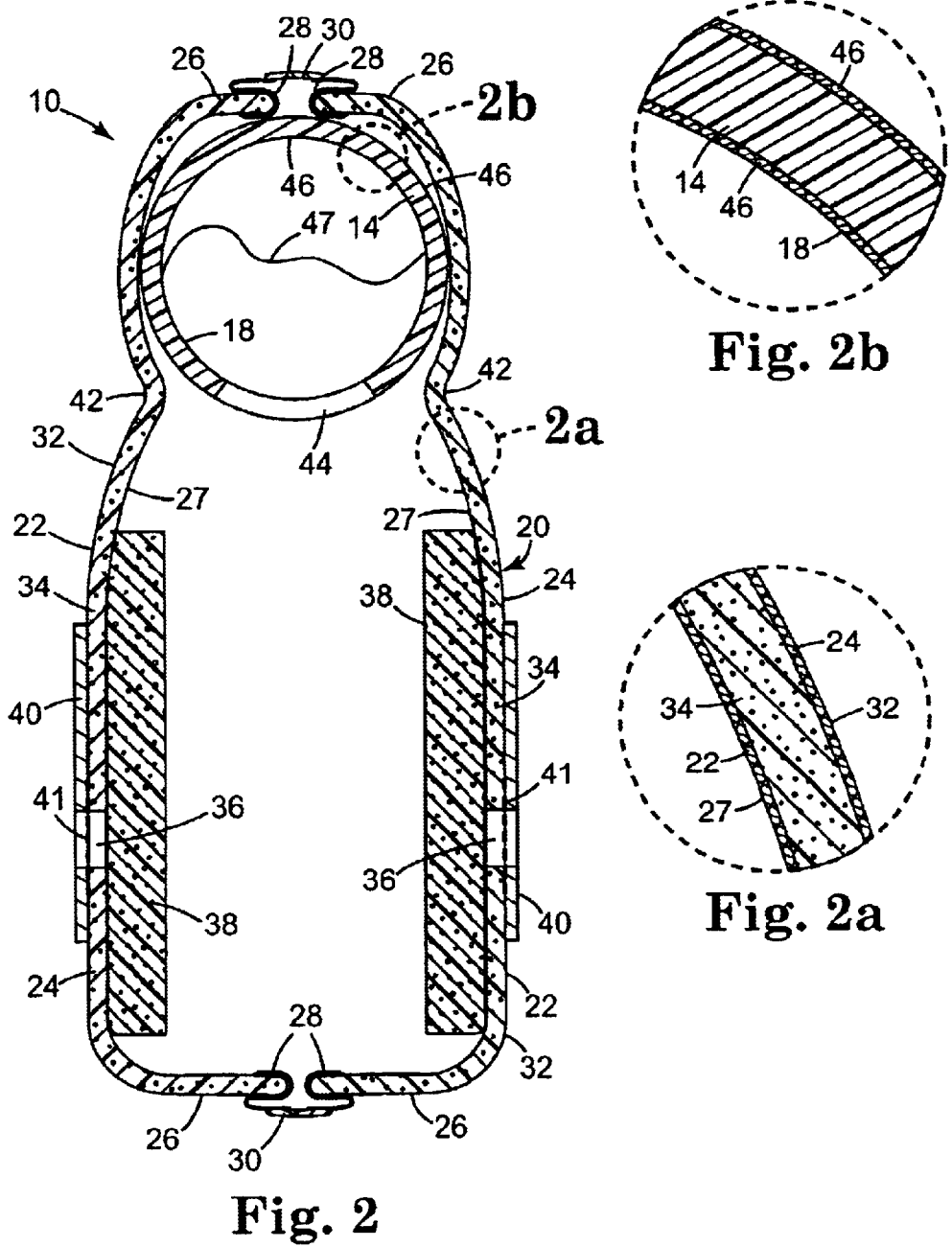
FIG. 2 is an enlarged sectional view taken approximately along line 2—2 of figure 1.

As is best seen in FIG. 2, each of the wall portions 22 comprise layers of fabric (e.g., a stretchable fabric such as a knitted or non-woven fabric) defining its inner surface 27 and its outer surfaces 32, and a layer 34 of thermally formed foam between and bonded to those layers of fabric. The layers 34 of thermally formed foam are continuous through the junctures between the side wall parts 24 and the peripheral parts 26 of the wall portions 22 and are sufficiently thick to provides stiff, flexible, shape retaining, wall portions 22 adapted to protect the reel. The thermally formed foam layer 34 in each wall portion 22 can have different thicknesses along different parts of the wall portion 22, but should have a thickness in the range of about 0.12 to 0.5 inch (0.3 to 1.27 cm) thick and preferably in the range of about 0.019 to 0.25 inch (0.48 to 0.64 cm). The layer 34 of foam in each wall portion 22 should be thermally formed to have a density in the range of about 4 to 10 pounds per cubic inch (0.12 to 0.3 kilograms per cubic centimeter), and preferably in the range of about 6 to 8 pounds per cubic inch (0.18 to 0.24 kilograms per cubic centimeter). The wall portions 22 are formed by adhering the layers of stretchable fabric (e.g., stretchable woven, knitted, or non-woven fabric) to the opposite sides of a layer of low density polymeric foam (e.g., 2 to 3 pound per cubic inch or 0.06 to 0.09 kilograms per cubic centimeter closed cell cross linked polyurethane foam), heating the fabric and foam laminate in an oven, and compressing it in a die having a cavity corresponding to the shape of one of the wall portions 22. The initial thickness of the layer of foam to be compressed is selected so that the density of the foam will be increased to a desired density in the range indicated above. The layers of fabric will stretch as needed to correspond in shape to the surfaces of the wall portion 22 as it is formed in the die. The wall portion 22 is then cooled in the die (which can be facilitated by chilling the die) and then removed.

Although they need not be provided, preferably the container 10 has vent openings 36 through at least one and preferably both wall portions 22 that can have total areas in each wall portion 22 of at least 0.5 square inches or 3.2 square centimeters, preferably Those through vent openings should have a total area of at least 0.5 square inch (3.2 square centimeters) in each wall portion 22, with vent openings 36 in each wall portion having a total area of at least 0.75 square inch (4.8 square centimeters) being preferred, and vent openings in each wall portion having a total area of at least 1 square inch (6.5 square centimeters) being more preferred. Vent openings could be provided in the peripheral parts 26 of the wall portions 22, but as illustrated, the through vent openings 36 are in the side wall parts 24. The container 10 includes a layer 38 (e.g., 0.5 or 1.27 cm thick) of reticulated open cell foam along the inner surface 27 of each of the side wall parts 24 that will press against one side of a reel in the container 10 while still passing air and moisture vapor from within the container 10 to and through the vent openings 36.

The layers 38 of reticulated foam provide added protection for the reel 11 and insure that air and water vapor movement through the vent openings 36 will not be blocked by the side surfaces of the reel 11. The container 10 includes a semi-circular layer 40 of decorative material (e.g., polymeric material such as 0.6 inch or 1.5 cm thick polyvinyl chloride or urethane, or leather) adhered along the outer surface 32 of each of the wall portions 22. The through vent openings 36 extend through those layers 40 of decorative material, and the container includes layers 41 of fiberglass screen material between the outer surfaces 32 and the layers 40 of decorative material and extending across the vent openings 36 which restrict debris and other objects from entering the container 10 through the vent openings 36 and provide a good appearance for the vent openings 36. In addition to forming outlet openings for the vent openings 36 and securing the layers 41 of fiberglass screen material in place across the vent openings 36, the layers 40 of decorative material can be embossed or printed along its outer surface with indicia such as a trade name for the container 10 or its manufacturer's name and/or trademarks, or the like.

Figure 3:
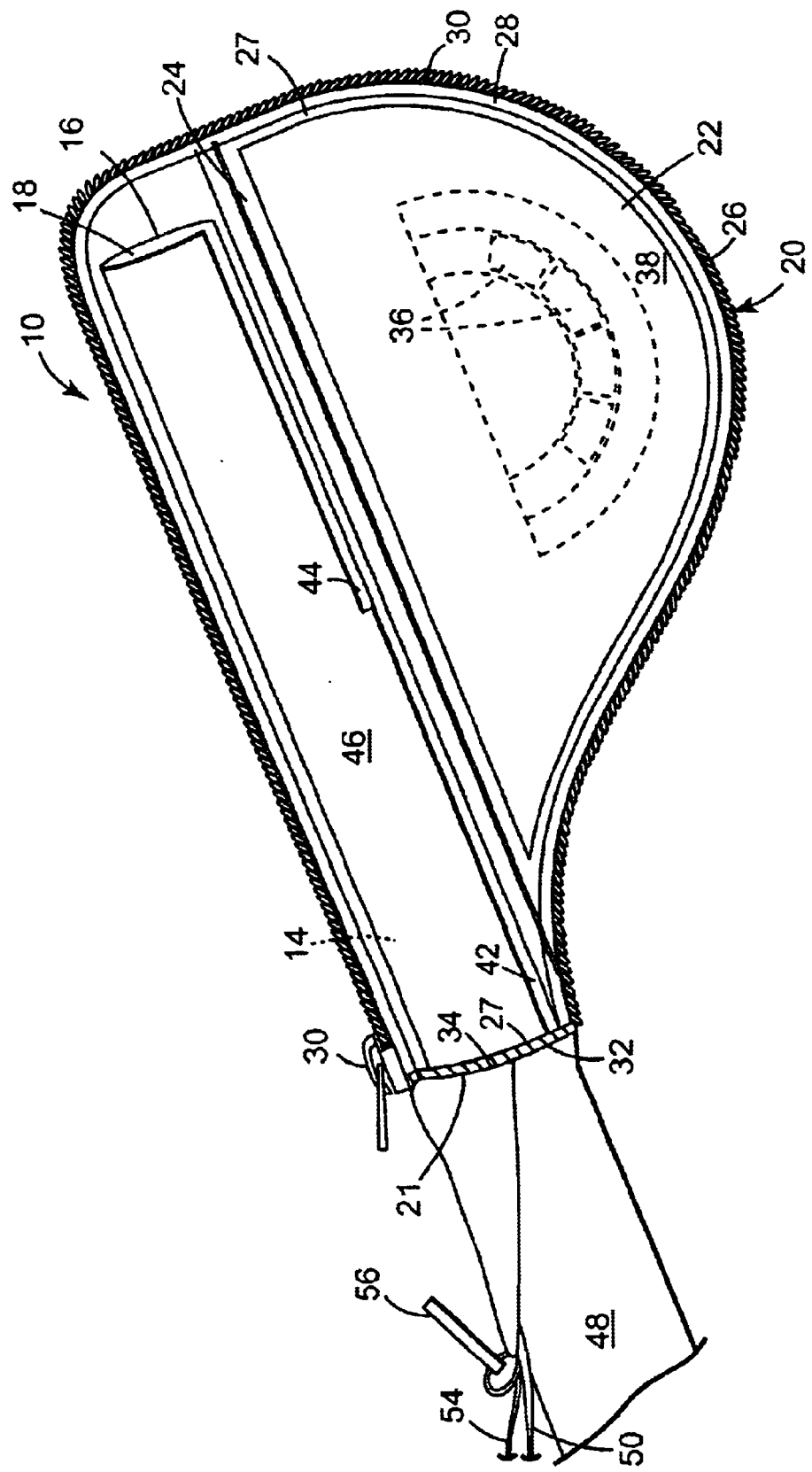
FIG. 3 is an enlarged fragmentary perspective view of the protective container of FIG. 1 in which the housing is open and one half of the housing has been broken away to show details.

As can be best seen in FIG. 3, the wall portions 22 each have a longitudinal stiffening channel 42 extending parallel with the axis of the tube 14 that both helps to form a recess along the inner surfaces 27 of the wall portions 22 that closely receives a part of the tube 14 adjacent its second end 16, and also stiffens the wall portion 22 against bending around axes transverse to the tube 14. If desired, other such longitudinal stiffening channels could be formed that, for example, could extend parallel to the axis of the tube 14, or radially of the wall portions 22, or in arcuate patterns.

The tube 14 has a slot 44 extending a short distance from its second end 16 that can receive the reel mounted on the rod adjacent the part of the reel mounted on the rod. The inner surface of the tube 14 and the outer surface of the tube 14 that would otherwise be exposed when the wall portions 22 of the housing 20 are open are covered with a layer 46 of cloth (e.g., woven nylon cloth) that separates the rod and reel from the surface of the tube 14. The layer 46 of cloth can also include portions 47 that form two, three, or more longitudinally extending pockets within the tube 14 and accessible through the open second end 16 of the tube 14 that, if the rod is separable into portions, can receive and separate those individual portions of the rod.

The outer surface of the tube 14 between the housing 20 and its first end 15 is covered with a layer 48 of heavy cloth (e.g., heavy duty woven nylon cloth) to which a handle 50 of the same cloth is sewn, together with an end cap 52 of the same cloth that closes the first end 15 of the tube 14. The end cap 52 is attached to on end of a shoulder strap 54. The other end of the shoulder strap 54 is attached to the layer of cloth 48 closely adjacent the housing 20 and has a D-ring 56 attached to it which can be used to hang up the container 10 or attach it to a structure, and provides a convenient place to attach tags such as identification or luggage tags.

Figure 4:
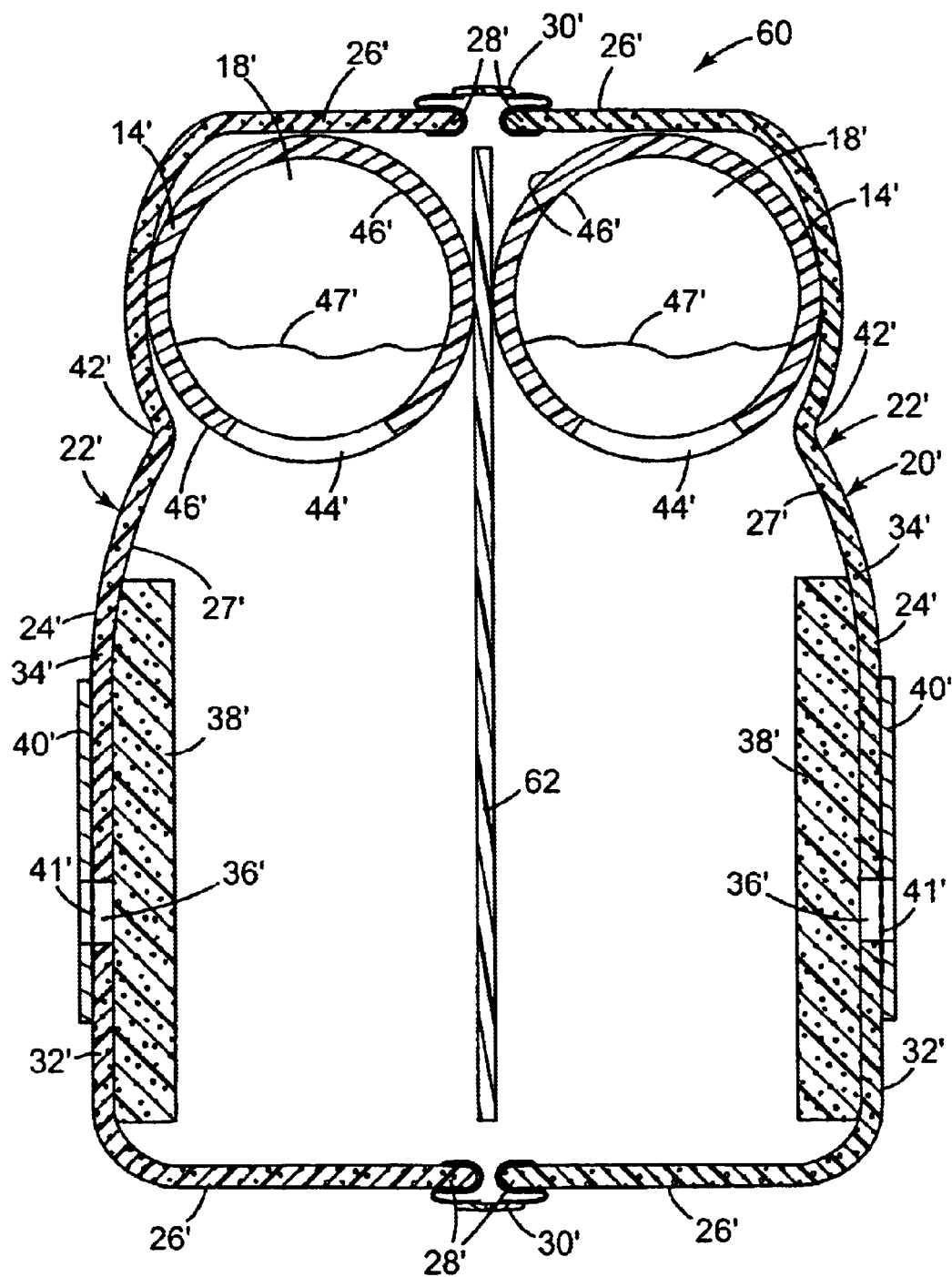
FIG. 4 is a sectional view of a second embodiment of a protective container according to the present invention for two fishing rods, each with a reel mounted on a handle portion of the rod, in which view a housing included in the container is closed, the sectional view being taken along a line on the container corresponding to the line along which FIG. 2 was taken on the first embodiment of the protective container.

Referring now to FIG. 4 of the drawing there is illustrated a cross section of a second embodiment of a protective container 60 according to the present invention for two fishing or fly rods with a reel mounted on a handle portion of each of the rods. The container 60 has many structural features that are generally the same as corresponding structural features on the container 10 (e.g., the container 60 has the same side appearance as that of the container 10 illustrated in FIG. 1), and those structural features are identified with the same reference numerals used on those features of the container 10 to which numerals have been added apostrophes.

The container 60 comprises two rigid elongate side by side tubes 14' each having an inner surface defining a cavity 18' adapted to receive one fishing rod. A flexible housing 20' is attached to and around the tubes 14 adjacent corresponding ones of their ends, which housing 20' is adapted to enclose the two reels and the handle portions of the rods on which the reels are mounted. That housing 20' comprises opposite wall portions 22' including side wall parts 24' each having a periphery and being adapted to lie along and across a different side of a different one of the reels and the handle portions of the rods. The wall portions 22 each also include a peripheral part 26'. The peripheral parts 26' of the wall portions 22' extend toward each other from the peripheries of the side wall parts 24' and have distal edges 28' adapted to be positioned closely adjacent each other. The opposite wall portions 22' have opposed inner surfaces 27' shaped to define (with the distal edges 28' closely adjacent each other) a cavity between the opposite wall portions 22' that can receive the reels and the handle portions of the rods on which the reels are mounted. Means in the form of a heavy duty zipper 30' are provided for releasably attaching together the distal edges 28' of the peripheral parts 26'. When that zipper 30' is open, the opposite wall portions 22' can be spread apart or separated by bending them adjacent where they are attached around the tubes 14 to allow the rods and reels to be placed in or removed from the container 60. When closed the zipper 30' retains the wall portions 22' in their protective positions around the reels and handle portions. The Main difference between the container 60 and the container 10 is that the container 60 encloses two tubes 14' instead of only one, and that the peripheral parts 26' of the wall portions 22' project farther from the peripheries of the side wall parts 24' to form a wider cavity between the opposite wall portions 22' that can receive the two tubes 14' and the two rods and reels. Also, the container 60 includes a pad 62 including two outer layers of cloth (e.g., woven nylon cloth) sewn around a layer of foam (e.g., a 0.25 inch or 0.6 cm thick layer of foam) that has a portion held between the tubes 14' and a portion extending into the cavity between where reels on rods in the tubes 14' will be positioned in the housing 20 to protect those reels from contacting and damaging each other.

Like the wall portions 22, the wall portions 22' comprise layers of fabric (e.g., a stretchable fabric such as a knitted or non-woven fabric) defining their inner surfaces 27' and their outer surfaces 32', and layers 34' of thermally formed foam between and bonded to those layers of fabric. The layers 34' of thermally formed foam are continuous through the junctures between the side wall parts 24' and the peripheral parts 26' of the wall portions 22' and are sufficiently thick to provide stiff, flexible, shape retaining, wall portions 22' adapted to protect the reels. The thermally formed foam layer 34' in each wall portion 22' can have different thicknesses along different parts of the wall portion 22' and should have thicknesses and densities in the ranges indicated above for the wall portions 22. The wall portions 22' are formed by the same method described above to form the wall portions 22. Also, alternatively the wall portions 22' can have vent openings 36' through the wall portions 22' located and having the sizes indicated above for the vent openings 36, and the container 60 includes a layer 38' (e.g., 0.5 or 1.27 cm thick) of reticulated open cell foam along the inner surface 27' of each of the side wall parts 24' that will press against one side of the adjacent one of the reels in the container 60 while still passing air and moisture vapor from within the container 60 to and through the vent openings 36'.

The layers 38' of reticulated foam provides added protection for the reels 11 and insure that air and water vapor movement through the vent openings 36' will not be blocked by the side surfaces of the reels 11. The container 60 includes a semi-circular layer 40' of decorative material (e.g., polymeric material such as 0.6 inch or 1.5 cm thick polyvinyl chloride or urethane, or leather) adhered along the outer surface 32' of each of the wall portions 22'. The through vent openings 36' extend through those layers 40' of decorative material, and the container includes layers 41' of fiberglass screen material between the outer surfaces 32' and the layers 40' of decorative material and extending across the vent openings 36' which restrict debris and other objects from entering the container 60 through the vent openings 36' and provide a good appearance for the vent openings 36'. The layers 40' of decorative material can be embossed or printed along its outer surface with indicia such as a trade name for the container 60 or its manufacturer's name and/or trademarks, or the like.

The wall portions 22' each have a longitudinal stiffening channel 42' extending parallel with the axes of the tubes 14' that both helps to form a recess along the inner surface 27' of the adjacent wall portion 22' that closely receives a part of the adjacent tube 14' and also stiffens the wall portion 22' against bending around axes transverse to the tubes 14'. If desired, other such longitudinal stiffening channels of the types described above could be formed in the wall portions 22'.

Each tube 14' has a slot 44' extending a short distance from its end in the housing 20' that can receive the reel mounted on the rod adjacent the part of the reel mounted on the rod. The inner surfaces of the tubes 14' and the portions of the outer surfaces of the tubes 14' that would otherwise be exposed when the wall portions 22' of the housing 20' are open care covered with a layer 46' of cloth (e.g., woven nylon cloth) that separates the rods and reels from the surfaces of the tubes 14' and can also include portions 47' that form two, three, or more longitudinally extending pockets within each tube 14' and accessible through the open end of the tube 14' that, if the rods are separable into portions, can receive and separate those individual portions of the rods.

Although not illustrated, the outer surfaces of the tubes 14' between the housing 20' and the ends of the tubes 14' opposite the housing 20' can also be covered with a layer of heavy cloth that encircles both tubes 14' (e.g., heavy duty woven nylon cloth) to which a handle of the same cloth can be sewn, together with an end cap of the same cloth that closes the ends of the tubes 14' opposite the housing 20'. The end cap can be attached to on end of a shoulder strap with the other end of the shoulder strap being attached to the layer of cloth closely adjacent the housing and having a D-ring attached to it.

The present invention has now been described with reference to two embodiments and possible modifications thereof. It will be apparent to those skilled in the art that many changes can be made in the embodiment described without departing from the scope of the present invention. For example, the container according to the present invention could be adapted to contain types of rods with reels attached to them other than fly rods, such as spinning rods or casting rods which have reels seated at positions centered along the handle or close to the end of the handle from which the rod projects. For such purposes the housing 20 could either be spaced a short distance from the second end 16 of the tube 14 toward its first end 15, and/or a part of the container 10 could extend from the side of the housing 20 opposite the first end 15 of the tube 14 that could enclose part of the handle. Thus, the scope of the present invention should not be limited to the structure and modifications described in this application, but only by the structures, and modifications described by the language of the claims and the equivalents thereof.

What is claimed is:

1. A protective container for a fishing rod with a reel mounted on a handle portion of the rod, said container comprising:

a rigid elongate tube having opposite sides, first and second ends, an axis between said ends, and an inner surface defining a cavity adapted to receive a fishing rod; and a housing attached to the tube at an area of attachment adjacent said second end, said housing being adapted to enclose the reel and the handle portion of a rod on which the reel is mounted, said housing comprising:

opposite wall portions including side wall parts each having a periphery and being adapted to lie along and across a different side of the reel and handle portion of the rod, and a peripheral parts, the peripheral part of each of said wall portions having a juncture with the side wall part of the respective wall portion and the peripheral parts extending toward each other from the peripheries of said side wall parts and having distal edges extending from the area of attachment at one side of the tube to the area of attachment at the opposite side of the tube, said distal edges being adapted to be positioned closely adjacent each other and when positioned closely adjacent each other the edges extend along the tube toward and around the second end of the tube from said opposite sides of the tube at said area of attachment, said opposite wall portions having outer surfaces and having opposed inner surfaces shaped to define with said distal edges closely adjacent each other, a cavity between said opposite wall portions for receiving the reel and the handle portion of the rod; and means for releasably attaching together the distal edges of the said peripheral parts;

said side wall parts and said peripheral parts of said wall portions comprising layers of fabric defining said inner and outer surfaces, and a layer of thermally formed foam between and bonded to said layers of fabric, said layer of thermally formed foam being continuous through the junctures between the side wall parts and the peripheral parts of the wall portions and being sufficiently thick to provide stiff, flexible, shape retaining side wall portions adapted to protect the reel when said means for releasably attaching attaches together the distal edges of said peripheral parts, and said side wall portions being bendable adjacent said area of attachment of said housing to said tube to afford separation of the distal edges of the peripheral parts of said wall portions to allow the rod to be placed in or removed from the container when said means for releasably attaching is released.

2. A container according to claim 1 wherein said layer of thermally formed foam is in the range of about 0.12 to 0.5 inch or 0.3 to 1.27 cm thick and has a density in the range of about 4 to 10 pounds per cubic inch or 0.12 to 0.3 kilograms per cubic centimeter.

3. A container according to claim 1 wherein said layer of thermally formed foam is a closed cell foam in the range of about 0.19 to 0.25 inch or 0.48 to 0.64 cm thick and has a density in the range of about 6 to 8 pounds per cubic inch or 0.18 to 0.24 kilograms per cubic centimeter.

4. A container according to claim 1 wherein each of said side wall parts of said wall portions has a through vent opening.

5. A container according to claim 4 wherein said through vent openings in said side wall parts have an area of at least 0.5 square inch or 3.2 square centimeters in each of said side wall parts.

6. A container according to claim 4 wherein said through vent openings in said side wall parts have an area of at least 0.75 square inch or 4.8 square centimeters in each of said side wall parts.

7. A container according to claim 4 further including a layer of reticulated foam along the inner surface of each of said wall portions across said through vent opening.

8. A container according to claim 4 further including a layer of polymeric material adhered along the outer surface of each of said wall portions, said through vent openings extend through the layers of polymeric material, and said housing further includes layers of screen material between the outer surfaces and the layers of polymeric material and extending across said vent openings.

9. A container according to claim 1 wherein said side wall parts are formed to have longitudinal stiffening channels.

10. A container according to claim 9 wherein said longitudinal stiffening channels extend parallel with the axis of said tube.

11. A container according to claim 1, wherein said container is adapted to contain two fishing rods with a reel mounted on a handle portion of each of the rods, said container comprising:
two rigid elongate tubes, said tubes having aligned first and second ends and having parallel axes between said ends, and each of said tubes having an inner surface defining a cavity adapted to receive a fishing rod; and
said housing is attached to both of the tubes adjacent said second ends, said housing being adapted to enclose two reels mounted on the handle portions of said rods and including a pad projecting into the cavity to prevent the two reels from contacting each other.

12. A container according to claim 1 wherein when the distal edges of the peripheral parts extending toward each other from the peripheries of said side wall parts are closely adjacent each other, said distal edges are each generally in an imaginary plane parallel to said side wall parts along which imaginary plane extends the axis of said tube.

13. A protective container for a fishing rod with a reel mounted on a handle portion of the rod, said container comprising:
a rigid elongate tube having first and second ends, an axis between said ends, and an inner surface defining a cavity adapted to receive said fishing rod; and
a housing attached to the tube adjacent said second end, said housing being adapted to enclose the reel and the handle portion of the rod on which the reel is mounted, said housing comprising:
opposite wall portions including side wall parts generally parallel to said axis, each having a periphery and being adapted to lie along and across a different side of the reel and handle portion of the rod, and peripheral parts the peripheral parts extending toward each other from the peripheries of said side wall parts and having distal edges adapted to be positioned closely adjacent each other, said opposite wall portions having outer surfaces, and having opposed inner surfaces shaped to define with said distal edges closely adjacent each other, a cavity between said opposite wall portions, for receiving the reel and the handle portion of the rod, said side wall parts of said wall portions having through vent openings;
means for releasably attaching together the distal edges of said peripheral parts; and
a layer of reticulated foam along the inner surface of each of said wall portions extending across the vent openings.

14. A container according to claim 13 wherein said through vent openings have an area of at least 0.5 square inch or 3.2 square centimeters in each of said side wall parts.

15. A container according to claim 13 wherein said through vent openings have an area of at least 0.75 square inch or 4.8 square centimeters in each of said side wall parts.

16. A container according to claim 13 wherein said through vent openings have an area of at least 1 square inch or 6.5 square centimeters in each of said side wall pans.

17. A container according to claim 13 wherein when the distal edges of the peripheral parts extending toward each other from the peripheries of said side wall parts are closely adjacent each other, said distal edges are each generally in an imaginary plane parallel to said side wall parts along which imaginary plane extends the axis of said tube.

18. A container according to claim 13 further including a layer of decorative material attached along the outer surface of each of said wall portions, said through vent openings extend through the layers of decorative material, and said housing further includes layers of screen material between the outer surfaces and the layers of decorative material and extending across said vent openings.

19. A protective container for a fishing rod with a reel mounted on a handle portion of the rod, said container comprising:
a rigid elongate tube having first and second ends, an axis between said ends, and an inner surface defining a cavity adapted to receive said fishing rod; and
a housing attached to the tube adjacent said second end, said housing being adapted to enclose the reel and the handle portion of the rod on which the reel is mounted, said housing comprising:
opposite wall portions including side wall parts each having a periphery and being adapted to lie along and across a different side of the reel and handle portion of the rod, and pripheral parts, the peripheral parts extending toward each other from the peripheries of said side wall parts and having distal edges adapted to be positioned closely adjacent each other, said opposite wall portions having outer surfaces, and having opposed inner surfaces shaped to define with said distal edges closely adjacent each other a cavity between said opposite wall portion, for receiving the reel and the handle portion of the rod, said wall portions having through vent openings;
means for releasably attaching together the distal edges of said peripheral parts;
a layer of decorative material adhered along the outer surface of each of said wall portions, said through vent openings extending through the layers of decorative material; and
layers of screen material between the outer surfaces and the layers of decorative material and extending across said vent openings.

20. A container according to claim 19 wherein said housing has a through vent opening of said through vent openings in each of said side wall parts and said housing further includes a layer of reticulated foam along the inner surface of each of said wall portions extending across the vent opening.

* * * * *

UNITED STATES PATENT AND TRADEMARK OFFICE
CERTIFICATE OF CORRECTION

PATENT NO. : 6,865,841 B2
DATED : March 15, 2005
INVENTOR(S) : Wieringa, Jeffrey L.

It is certified that error appears in the above-identified patent and that said Letters Patent is hereby corrected as shown below:

<u>Column 8,</u>
Line 22, after "and" delete "a".
Line 37, after "portions" insert -- , --.

<u>Column 10,</u>
Line 7, delete "squarc" and insert -- square --.
Line 8, delete "paris" and insert -- parts --.
Line 14, delete "pans" and insert -- parts --.
Line 41, delete "pripheral" and insert -- peripheral --.

Signed and Sealed this

Thirtieth Day of August, 2005

JON W. DUDAS
*Director of the United States Patent and Trademark Office*